US012728637B2

(12) United States Patent
Kobayashi

(10) Patent No.: US 12,728,637 B2
(45) Date of Patent: Sep. 8, 2026

(54) LIQUID EJECTING HEAD AND LIQUID EJECTING APPARATUS

(71) Applicant: SEIKO EPSON CORPORATION, Tokyo (JP)

(72) Inventor: Haruki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 18/903,057

(22) Filed: Oct. 1, 2024

(65) Prior Publication Data

US 2025/0108615 A1 Apr. 3, 2025

(30) Foreign Application Priority Data

Oct. 2, 2023 (JP) ................................ 2023-171049

(51) Int. Cl.
*B41J 2/14* (2006.01)
*B41J 2/175* (2006.01)

(52) U.S. Cl.
CPC ................ *B41J 2/14* (2013.01); *B41J 2/175* (2013.01)

(58) Field of Classification Search
CPC . B41J 2/14; B41J 2/14233; B41J 2/175; B41J 2/17563; B41J 2002/14241; B41J 2002/14362; B41J 2002/14419; B41J 2002/14491; B41J 2202/12; B41J 2202/19
See application file for complete search history.

(56) References Cited

U.S. PATENT DOCUMENTS

| | | | | |
|---|---|---|---|---|
| 2009/0295867 | A1* | 12/2009 | Oguchi | B41J 2/145 347/40 |
| 2014/0292933 | A1* | 10/2014 | Hagiwara | B41J 2/155 347/47 |
| 2015/0029265 | A1* | 1/2015 | Iwanaga | B41J 2/14072 347/50 |
| 2015/0273851 | A1 | 10/2015 | Akahane | |
| 2020/0101733 | A1* | 4/2020 | Hagiwara | B41J 2/17509 |
| 2022/0024207 | A1 | 1/2022 | Watanabe | |

FOREIGN PATENT DOCUMENTS

| | | |
|---|---|---|
| GB | 2563719 | 12/2018 |
| JP | 2015-214130 A | 12/2015 |

* cited by examiner

*Primary Examiner* — Anh T Vo
(74) *Attorney, Agent, or Firm* — WORKMAN NYDEGGER

(57) ABSTRACT

A liquid ejecting head includes: head chips including first-head-chips being arranged in a first-direction and constituting a first-chip-line and second-head-chips being arranged in the first-direction and constituting a second-chip-line displaced from the first-chip-line in a second-direction being orthogonal to the first-direction; a distribution flow channel includes a main branching flow channel, a first-sub-branching-flow-channel being a flow channel disposed between the main branching flow channel and the head chips in a direction of lamination and configured to communicate with the first-main-branching-portion, the first-sub-branching-flow-channel including a first-sub-branching-portion-A and a first-sub-branching-portion-B which branch off at a first-sub-branching-position, and the first-sub-branching-position overlaps a first-gap defined between the first-head-chips located adjacent to each other when viewed in the direction of lamination.

10 Claims, 6 Drawing Sheets

LIQUID EJECTING HEAD AND LIQUID EJECTING APPARATUS

The present application is based on, and claims priority from JP Application Serial Number 2023-171049, filed Oct. 2, 2023, the disclosure of which is hereby incorporated by reference herein in its entirety.

BACKGROUND

1. Technical Field

The present disclosure relates to techniques for a liquid ejecting head and a liquid ejecting apparatus.

2. Related Art

There has heretofore been known a technique concerning a liquid ejecting head, which includes a common supply flow channel disposed between a first line of heads and a second line of heads, distribution flow channels branching off from the common supply flow channel and supplying a liquid to the respective heads, and a supply port portion that supplies the liquid to the common supply flow channel (JP-A-2015-214130). The supply port portion is connected to a central part of the common supply flow channel in a direction of arrangement of the heads.

In the related art, lengths of respective flow channels extending from the supply port portion to the respective heads vary in the case where the common supply flow channel to which the supply port portion is connected and the distribution flow channels branching off from the common supply flow channel are formed on the same plane. Accordingly, pressure losses are more likely to vary among the respective flow channels.

SUMMARY

According to a first aspect of the present disclosure, a liquid ejecting head is provided. The liquid ejecting head includes: a plurality of head chips including a plurality of first head chips being arranged in a first direction and constituting a first chip line, and a plurality of second head chips being arranged in the first direction and constituting a second chip line; and a distribution flow channel member including a distribution flow channel formed by laminating a plurality of flow channel substrates in a direction of lamination and configured to distribute and supply the liquid to the plurality of head chips. The second chip line is displaced from the first chip line in a second direction being orthogonal to both the first direction and the direction of lamination, a first gap is defined between the first head chips located adjacent to each other out of the plurality of first head chips, a second gap is defined between the second head chips located adjacent to each other out of the plurality of second head chips, at least one or more of the second head chips out of the plurality of second head chips are disposed at positions filling one or more of the first gaps when viewed in the second direction, the distribution flow channel includes a main branching flow channel having a first main branching portion and a second main branching portion which branch off at a main branching position, a first sub branching flow channel being a flow channel disposed between the main branching flow channel and the plurality of head chips in terms of the direction of lamination and configured to communicate with the first main branching portion, the first sub branching flow channel including a first sub branching portion A and a first sub branching portion B which branch off at a first sub branching position, and the first sub branching position overlaps the first gap when viewed in the direction of lamination.

According to a second aspect of the present disclosure, a liquid ejecting apparatus is provided. This liquid ejecting apparatus includes: the liquid ejecting head according to the aspect described above; and a liquid reservoir configured to reserve the liquid to be supplied to the liquid ejecting head.

DESCRIPTION OF EMBODIMENTS

A. Embodiment

Figure 1:
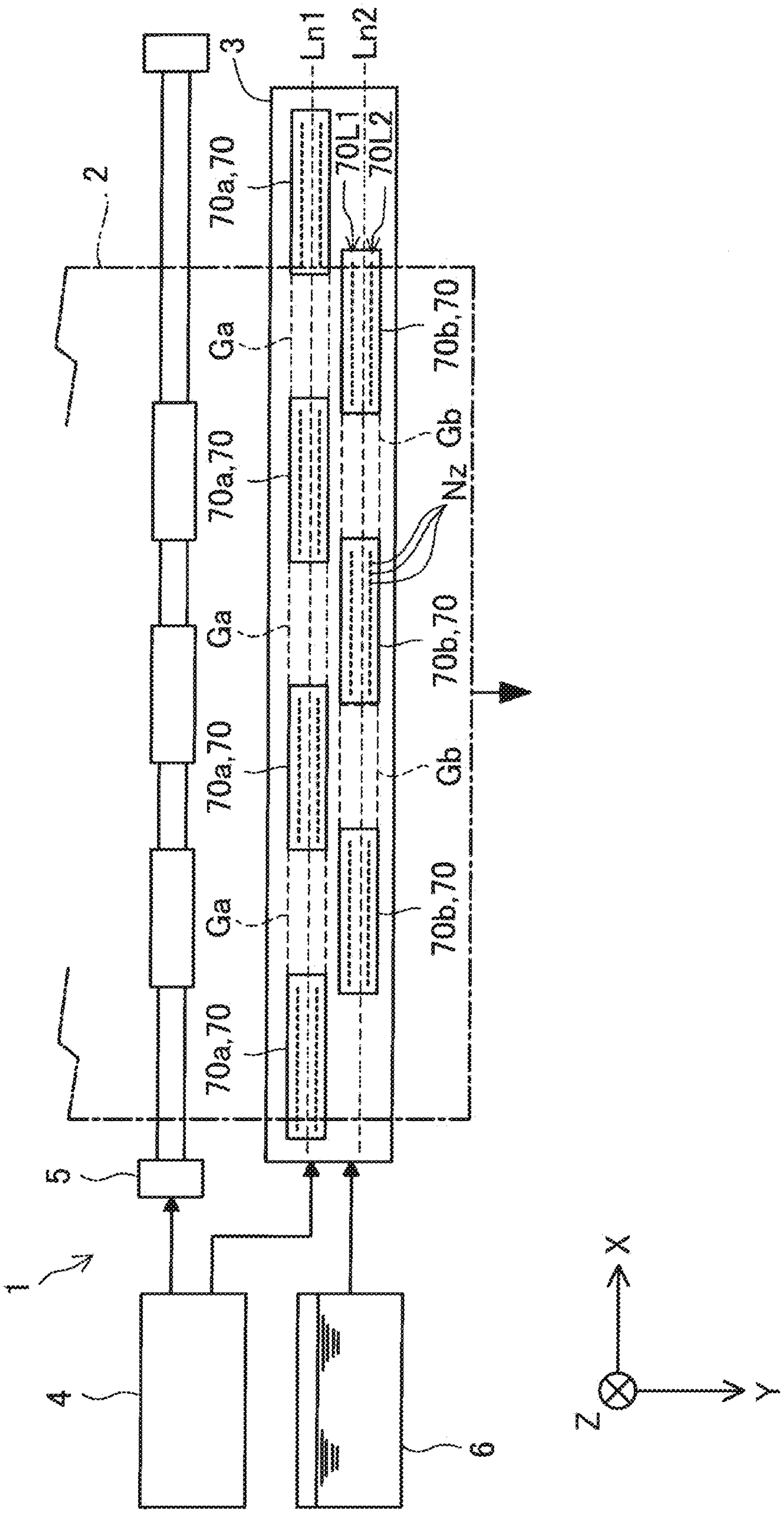
FIG. 1 is a diagram schematically illustrating a configuration of a liquid ejecting apparatus of an embodiment of the present disclosure.

FIG. 1 is a diagram schematically illustrating a configuration of a liquid ejecting apparatus 1 of the present embodiment. FIG. 1 is provided with an x axis, a y axis, and a z axis which are orthogonal to one another. The z axis is a coordinate axis that is parallel to a vertical direction. Arrows that indicate the x axis, the y axis, and the z axis in FIG. 1 and arrows that indicate the x axis, the y axis, and the z axis in other drawings indicate the same directions, respectively. In a case of specifying an orientation, a positive direction being a direction indicated by each arrow is defined as "+" while a negative direction being a direction opposite to the direction indicated by the relevant arrow is defined as "−", and these positive and negative signs are used for representations of directions accordingly. The −z axis direction is an opening direction in which a nozzle Nz to be described later is open, and is a direction in which a liquid is ejected from the nozzle Nz.

The liquid ejecting apparatus 1 includes a liquid ejecting head 3, a control device 4, a transportation mechanism 5, and a liquid reservoir 6. In the present embodiment, the liquid ejecting apparatus 1 is a printer which is an apparatus that prints images and the like on a surface of a medium 2 such as print paper or a synthetic resin film by ejecting an ink as a type of a liquid from the nozzles Nz provided to the liquid ejecting head 3. The control device 4 comprehensively controls respective units constituting the liquid ejecting apparatus 1. The transportation mechanism 5 transports the medium 2 from a sheet feeding side to a sheet discharge side in response to a control instruction from the control device 4. The liquid reservoir 6 communicates with the liquid ejecting head 3 through a flow channel such as a tube, and reserves the liquid to be supplied to the liquid ejecting head 3. The liquid reservoir 6 may adopt various configurations such as a cartridge and a liquid refillable tank. The liquid in the liquid reservoir 6 is sent to the liquid ejecting head 3 by driving a pump not illustrated. In a different embodiment, the liquid may be circulated between the liquid reservoir 6 and the liquid ejecting head 3.

The liquid ejecting head 3 includes head chips 70 that eject the liquid. The head chips 70 include first head chips 70*a* being arranged at intervals in a direction along the x axis direction and thereby constituting a first chip line Ln1, and second head chips 70*b* being arranged at intervals in the direction along the x axis direction and thereby constituting a second chip line Ln2. The direction along the x axis direction is equivalent to a longitudinal direction of the liquid ejecting head 3. In the present embodiment, four first head chips 70*a* are provided while three second head chips 70*b* are provided. That is to say, the number of the first head chips 70*a* is larger than the number of the second head chips 70*b* and is an even number. The second chip line Ln2 is displaced from the first chip line Ln1 in terms of a direction along the y axis direction. A direction of lamination is a direction in which the after-mentioned flow channel substrates included in the liquid ejecting head 3 are laminated.

In the present embodiment, a "first direction" is a direction along the x axis direction, which is equivalent to a longitudinal direction of the liquid ejecting head 3. A "second direction" is a direction, which is equivalent to the y axis direction in the present embodiment, orthogonal to the direction along the x axis direction and to a direction of lamination along the z axis direction.

A first gap Ga is defined between two adjacent first head chips 70*a* out of the first head chips 70*a*. In the present embodiment, the interval between every adjacent first head chips 70*a* is a constant interval. Accordingly, sizes of the respective first gaps Ga are equal. A second gap Gb is defined between two adjacent second head chips 70*b* out of the second head chips 70*b*. In the present embodiment, the interval between every adjacent second head chips 70*b* is a constant interval. Accordingly, sizes of the respective second gaps Gb are equal. At least some of the second head chips 70*b* out of the second head chips 70*b* are disposed at positions filling one or more first gaps Ga when viewed in the direction along the y axis direction. In the present embodiment, the respective second head chips 70*b* are disposed at positions filling the corresponding first gaps Ga when viewed in the direction along the y axis direction. In other words, when viewed in the direction along the y axis direction, an end portion in the +x direction of a second head chip 70*b* overlaps an end portion in the −x direction of one of a pair of first head chips 70*a* disposed to sandwich the first gap Ga, and an end portion in the −x direction of the second head chip 70*b* overlaps an end portion in the +x direction of the other first head chip 70*a* out of the pair of first head chips 70*a*. As described above, the first head chips 70*a* and the second head chips 70*b* are disposed in a staggered manner. Here, the number of the first head chips 70*a* and the number of the second head chips 70*b* are not limited to those of the present embodiment. For example, the number of the first head chips 70*a* may be equal to the number of the second head chips 70*b* or the number of the second head chips 70*b* may be larger than the number of the first head chips 70*a*.

Each of the head chips 70 includes the nozzles Nz that are formed at regular intervals in the direction along the x axis direction. In each of the head chips 70, the nozzles Nz include nozzles Nz constituting a first nozzle line 70L1 that extends in the direction along the x axis direction, and nozzles Nz constituting a second nozzle line 70L2 that extends in the direction along the x axis direction. The first nozzle line 70L1 is displaced from the second nozzle line 70L2 in the direction along the y axis direction.

Figure 2:
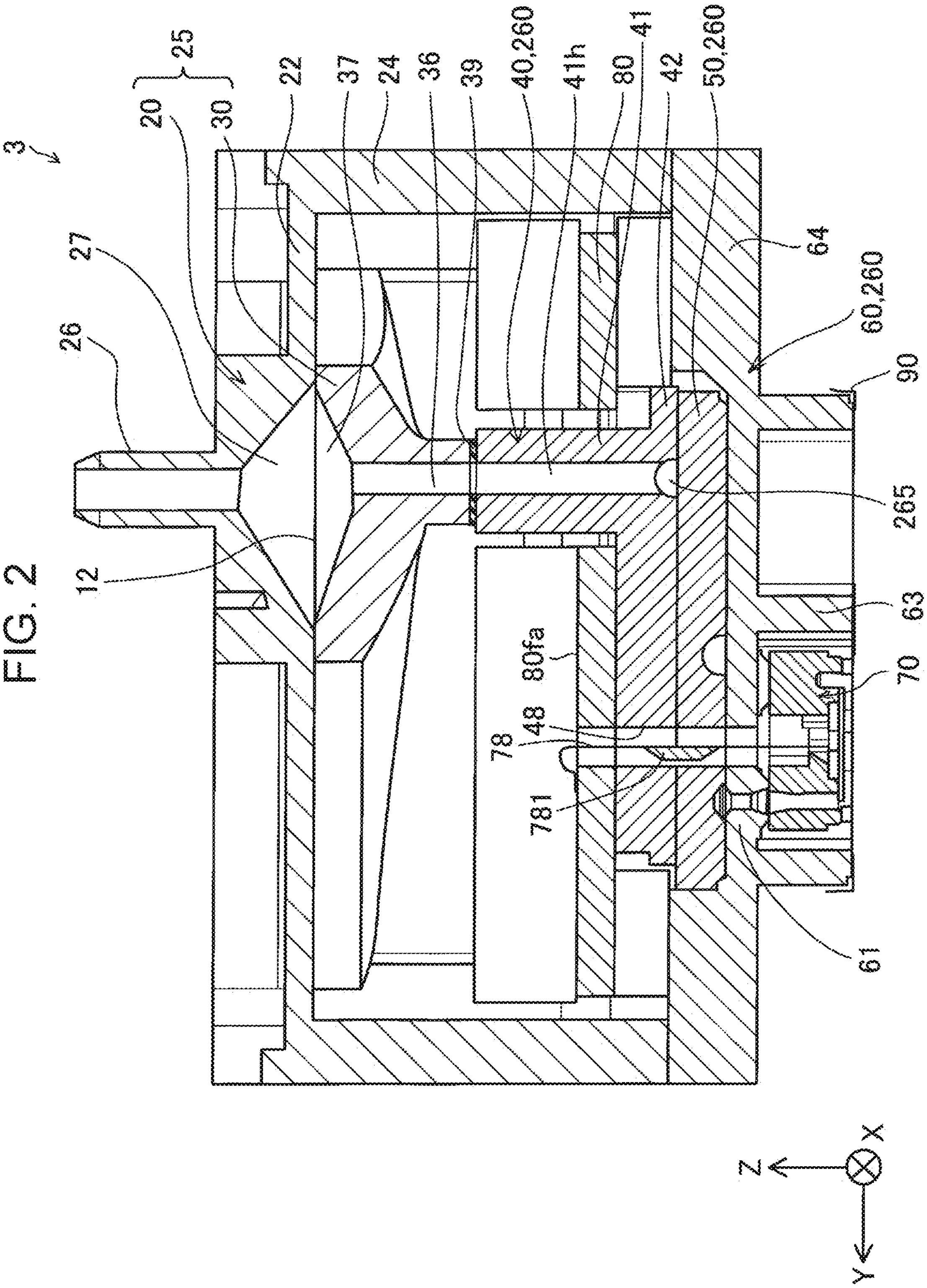
FIG. 2 is a schematic sectional view for explaining a liquid ejecting head.

FIG. 2 is a schematic sectional view for explaining the liquid ejecting head 3. The liquid ejecting head 3 includes a filter unit 25, a distribution flow channel member 260, the head chips 70, a relay board 80, and a fixation plate 90.

The filter unit 25 incorporates a filter 12 through which a liquid passes and is supplied to an after-mentioned main branching flow channel 580 provided to the distribution flow channel member 260. The filter 12 traps foreign substances such as dust and bubbles in the liquid. For example, the filter 12 can adopt a sheet-like material provided with multiple microscopic pores by densely weaving fibers of a metal, a resin, and the like, a material formed by piercing a plate-like member made of a metal, a resin, and the like so as to form multiple microscopic pores therein, and so forth.

The filter unit 25 constitutes a head upper wall of the liquid ejecting head 3. The filter unit 25 further includes a cover 20 and a filter forming member 30. The cover 20 is stacked on the filter forming member 30.

The cover 20 has a concave shape in which a −z axis direction side being an opening direction of the nozzles Nz is open. The cover 20 includes a cover upper wall 22 that constitutes the head upper wall, and a cover side wall 24 that extends from a peripheral edge portion of the cover upper wall 22 to the −z axis direction side. The cover upper wall 22 is provided with a connecting member 26 that projects to a +z axis direction side, and a first filter chamber 27 that is defined by the cover upper wall 22. The connecting member 26 has a tubular shape. A flow channel such as a tube to feed the liquid in the liquid reservoir 6 is connected to the connecting member 26. The first filter chamber 27 communicates with an internal flow channel of the connecting member 26.

The filter forming member 30 includes a second filter chamber 37 and a supply pipe 36. The second filter chamber 37 is defined by filter forming member 30 and is located on an opposite side from the first filter chamber 27 with the filter 12 interposed therebetween. The supply pipe 36 is a member that projects from the second filter chamber 37 to the −z axis direction side. An internal flow channel of the supply pipe 36 communicates with the second filter chamber 37. The liquid supplied to the connecting member 26 passes through the first filter chamber 27, the filter 12, the second filter chamber 37, and the supply pipe 36 in sequence, and flows into an introduction pipe of the distribution flow channel member 260 to be described later.

The distribution flow channel member 260 is formed by laminating flow channel substrates 40, 50, and 60 in the direction of lamination. The direction of lamination is the direction along the opening direction of the nozzles Nz, which is equivalent to the z axis direction. The distribution flow channel member 260 is disposed between the relay board 80 and the head chips 70 when viewed in the direction of lamination. The distribution flow channel member 260 includes distribution flow channels 265 that distributes and supplies the liquid to the head chips 70 included in the liquid ejecting apparatus 1. The flow channel substrates 40, 50, and 60 are referred to as a first flow channel substrate 40, a second flow channel substrate 50, and a third flow channel substrate 60 serving as a holder, which are arranged in sequence from a side where the filter unit 25 is located.

The first flow channel substrate 40 includes a plate-like substrate body 42, and a flow channel pipe 41 that projects from the substrate body 42 toward the supply pipe 36. The flow channel pipe 41 is connected to the supply pipe 36 with a sealing member 39 in between. The flow channel pipe 41 defines an introduction port 41*h* for introducing the liquid to the main branching flow channel 580 to be described later.

Some of the distribution flow channels 265 are formed at a surface of the substrate body 42 opposed to the second flow channel substrate 50.

The second flow channel substrate 50 is a plate-like member. Some of the distribution flow channels 265 are formed at a surface of the second flow channel substrate 50 opposed to the first flow channel substrate 40 and at a surface thereof opposed to the third flow channel substrate 60.

The third flow channel substrate 60 includes a plate-like substrate body 61, a chip housing chamber 63 to house the head chips 70, and a flange portion 64 that extends outward from the substrate body 61. Some of the distribution flow channels 265 are formed at a surface of the substrate body 61 opposed to the second flow channel substrate 50. The chip housing chamber 63 is defined by a plate member that extends from the substrate body 61 to the −z axis direction side. The flange portion 64 is fixed to the cover side wall 24.

The relay board 80 is disposed on the substrate body 42 of the first flow channel substrate 40. The relay board 80 is a plate-like member. The relay board 80 is electrically coupled to each of the head chips 70. The relay board 80 is a board that relays various signals supplied from the control device 4. The various signals include a control signal for controlling the liquid ejecting head 3 and a drive signal for driving the liquid ejecting head 3.

The head chips 70 eject the liquid supplied from the distribution flow channels 265 included in the distribution flow channel member 260. Each of the head chips 70 includes a flexible board 78 that passes through the distribution flow channel member 260 and the relay board 80 and is electrically coupled to the relay board 80. A flexible wiring board such as an FPC, a COF, or an FFC is preferably adopted as the flexible board 78, for example. Here, the FPC stands for the flexible printed circuit. The COF stands for the chip on film. The FFC stands for the flexible flat cable. The flexible board 78 includes a drive circuit 781. The drive circuit 781 is an electric circuit that switches whether or not to supply a drive signal Com to a piezoelectric element in the head chip 70 to be described later. The head chip 70 will be discussed later in detail.

The fixation plate 90 is a member in the form of a flat plate. The fixation plate 90 is formed from a metal. The fixation plate 90 is provided with openings located at positions opposed to the nozzle lines 70L1 and 70L2 of the respective head chips 70. The fixation plate 90 is fixed to the head chips 70 by using an adhesive.

As described above, the distribution flow channel member 260 is disposed between the relay board 80 and the head chips 70 in terms of the z axis direction being the direction of lamination.

Figure 3:
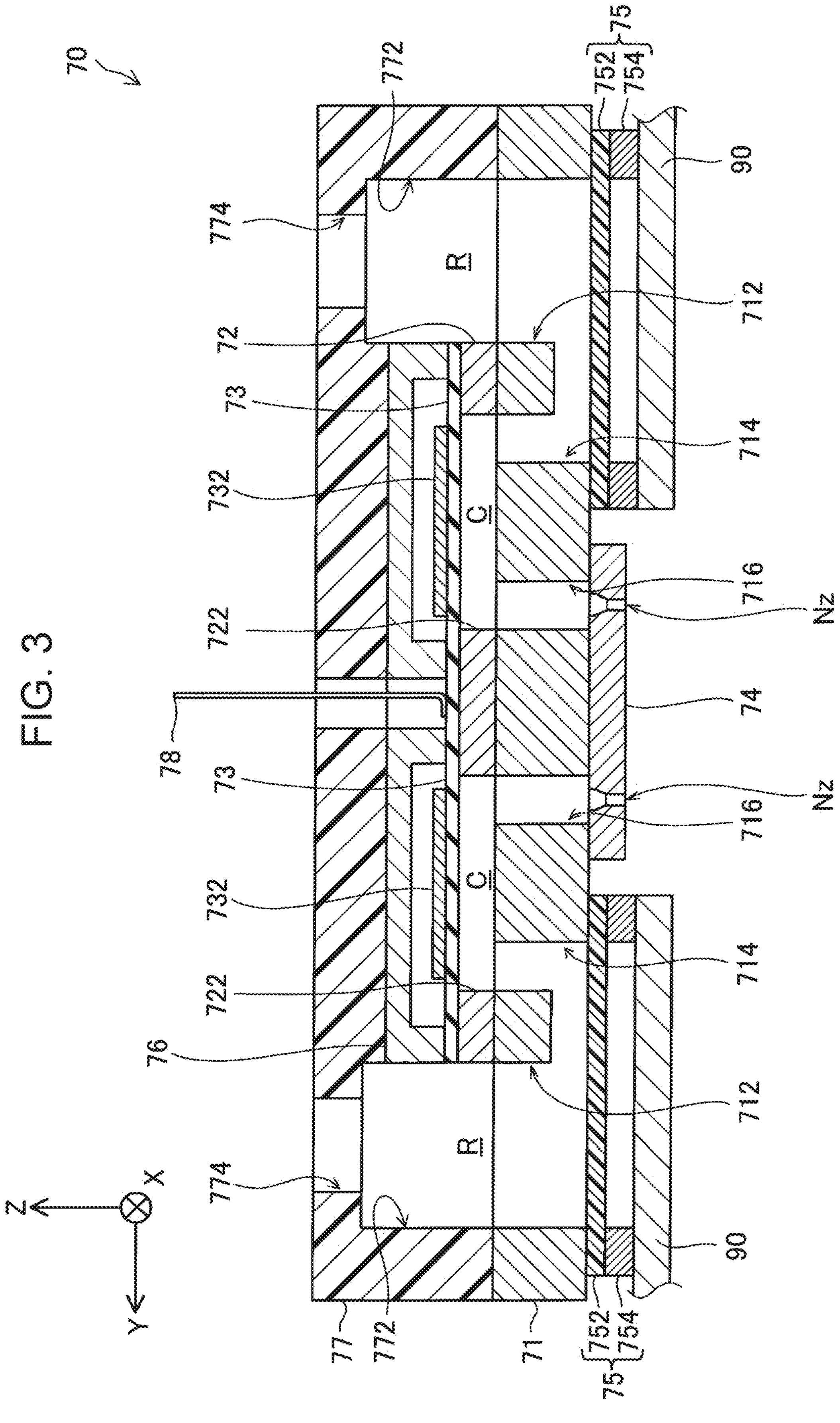
FIG. 3 is a sectional view of a head chip.

FIG. 3 is a sectional view of a head chip 70. Note that FIG. 3 also displays the fixation plate 90 in addition to the head chip 70. The head chip 70 includes a communication plate 71, a pressure chamber board 72 laminated at a surface in the −z axis direction of the communication plate 71, a vibration plate 73 laminated in the −z axis direction at the pressure chamber board 72, and a nozzle plate 74 as well as compliance units 75 disposed at a surface in the +z direction of the communication plate 71. The nozzles Nz are formed in the nozzle plate 74. Here, structures corresponding to the nozzles Nz on the respective nozzle lines 70L1 and 70L2 are substantially line-symmetrically provided to each head chip 70. Accordingly, the structure of the head chip 70 will be described below while focusing on one line of the nozzles Nz for the sake of convenience.

The communication plate 71 is a member in the form of a flat plate which constitutes the flow channels for the liquid. The communication plate 71 of the present embodiment is provided with openings 712, supply flow channels 714, and communication flow channels 716. A supply flow channel 714 and a communication flow channel 716 are formed for each nozzle Nz. The openings 712 are continuously provided across the nozzles Nz. The pressure chamber board 72 is a member in the form of a flat plate provided with openings 722 corresponding to nozzles Nz that are different from one another. The communication plate 71 and the pressure chamber board 72 are each formed from a single-crystal silicon substrate, for example.

The compliance units 75 are mechanisms for suppressing a variation in pressure inside the flow channels of the head chip 70. Each compliance unit 75 includes a sealing plate 752 and a support body 754. The sealing plate 752 is a resin member in the form of a film having flexibility. The support body 754 fixes the sealing plate 752 to the communication plate 71 so as to close the openings 712 and the respective supply flow channels 714 of the communication plate 71. The support body 754 is formed from a metal such as stainless steel.

The vibration plate 73 is a member in the form of a flat plate which can vibrate elastically. The vibration plate 73 is formed by laminating an elastic film formed from an elastic material such as silicon oxide, and an insulating film formed from an insulating material such as zirconium oxide. A lower end portion of the flexible board 78 is electrically coupled to the vibration plate 73. The vibration plate 73 is opposed to the communication plate 71 with spaces in between inside the respective openings 722 formed in the pressure chamber board 72. The spaces provided inside the respective openings 722 and between the communication plate 71 and the vibration plate 73 function as pressure chambers C that apply a pressure to the liquid. In the present embodiment, two lines of the pressure chambers C arrayed along the y axis direction are arranged along the x axis direction.

Drive elements 732 are provided at a surface of the vibration plate 73 on an opposite side from the pressure chambers C so as to correspond to the respective pressure chambers C. The drive elements 732 are elongate piezoelectric elements that extend along the x axis in plan view. Each piezoelectric element includes a pair of electrodes and a piezoelectric body between the pair of electrodes, for example. Here, the drive elements 732 may instead be thermoelectric conversion elements that generate thermal energy.

A support body 77 is fixed to the communication plate 71 and a protection plate 76. The support body 77 is integrally formed by molding a resin material, for example. The support body 77 of the present embodiment is a member provided with spaces 772 that constitute reservoirs R in conjunction with the openings 712 of the communication plate 71, and supply ports 774 communicating with the reservoirs R. The liquid introduced from the supply ports 774 is reserved in the reservoirs R. An ink reserved in the reservoirs R is distributed and put into the respective pressure chambers C through the supply flow channels 714, is sent from the pressure chambers C into the communication flow channels 716 and the nozzles Nz, and is ejected in the −z axis direction. Although FIG. 3 illustrates as if the two supply ports 774 are formed at the same position in the x axis direction, the supply ports 774 are formed at positions displaced from each other in reality.

Figure 4:
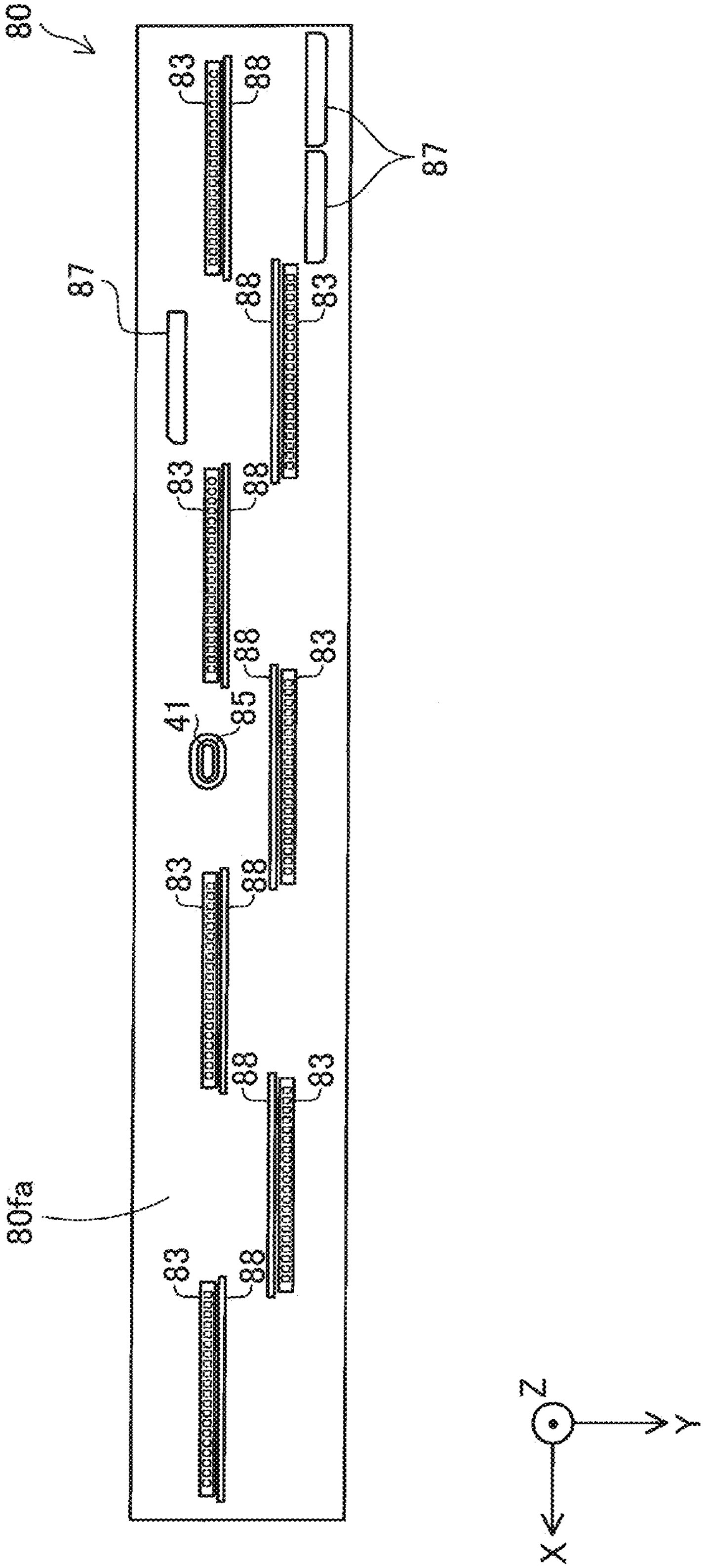
FIG. 4 is a plan view of a relay board viewed from a front surface side located on a filter unit side.

FIG. 4 is a plan view of the relay board 80 viewed from a front surface 80*fa* side located on the filter unit 25 side.

The relay board 80 includes a through hole 85 into which the flow channel pipe 41 is inserted, electric terminal units 83, connectors 87, and insertion holes 88. The through hole 85 is formed substantially at the center of the relay board 80 in the x axis direction being a longitudinal direction of the relay board 80. Here, the relay board 80 may include a cutout formed at a peripheral edge portion of the relay board 80 instead of the through hole 85. The flow channel pipe 41 is inserted into this cutout.

The electric terminal units 83 are provided corresponding to the head chips 70. In the present embodiment, the number of the electric terminal units 83 is seven. Each of the electric terminal units 83 is coupled to an upper end portion of the corresponding flexible board 78. Thus, the drive elements 732 and the electric terminal units 83 are electrically connected to one another by using the flexible boards 78.

Electric wiring that is electrically coupled to the control device 4 is coupled to the connectors 87. In the present embodiment, the number of the connectors 87 is three. The connectors 87 are formed outside of the electric terminal units 83 in the y axis direction.

The insertion holes 88 are formed corresponding to the electric terminal units 83. Each insertion hole 88 has a rectangular shape and is formed adjacent to the corresponding electric terminal unit 83. The upper end portion of the corresponding flexible board 78 is inserted into each insertion hole 88. Here, wiring (not illustrated) to electrically couple the connectors 87 to the electric terminal units 83 is formed in the relay board 80.

Figure 5:
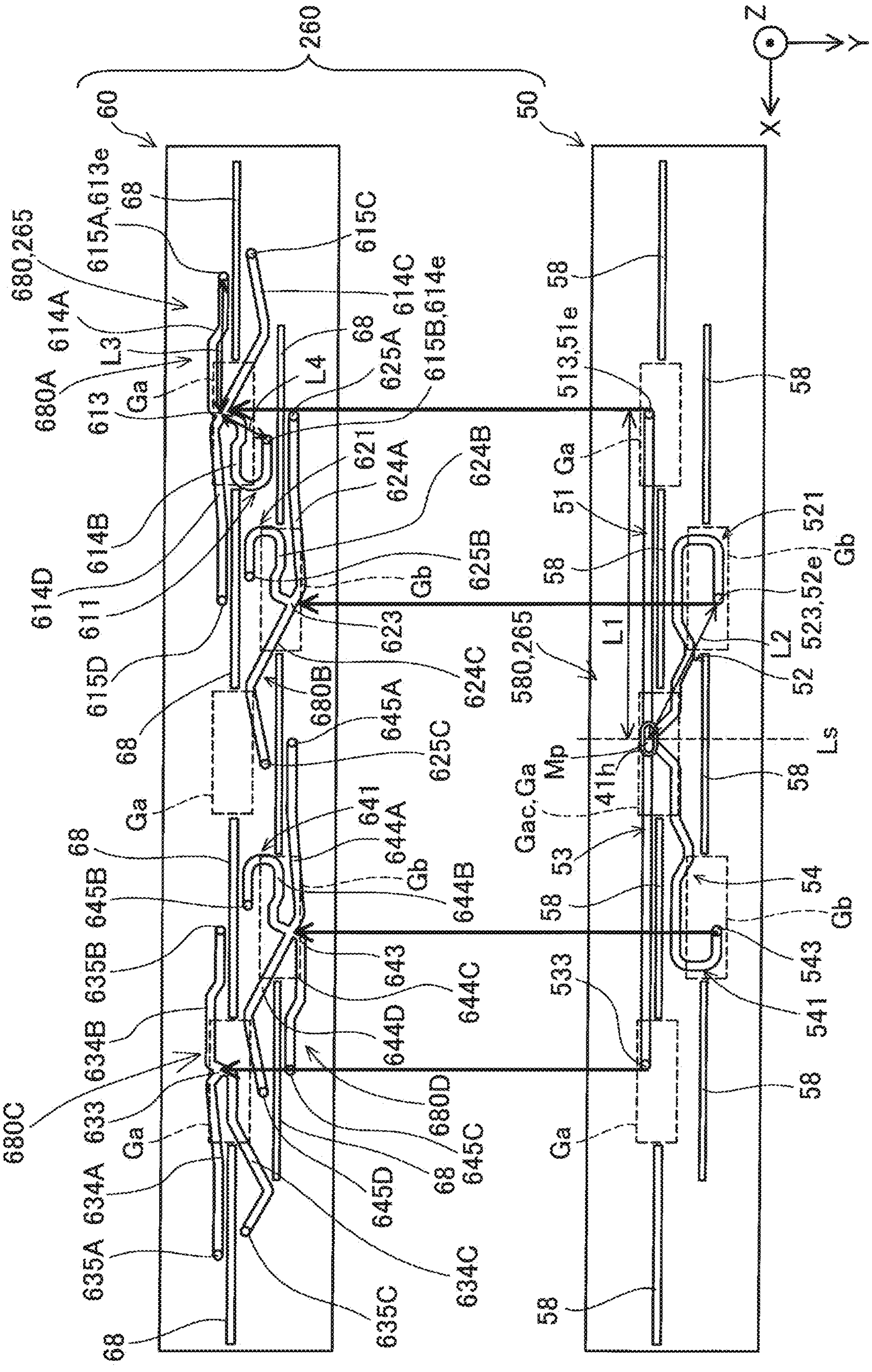
FIG. 5 is a first diagram for explaining distribution flow channels.
Figure 6:
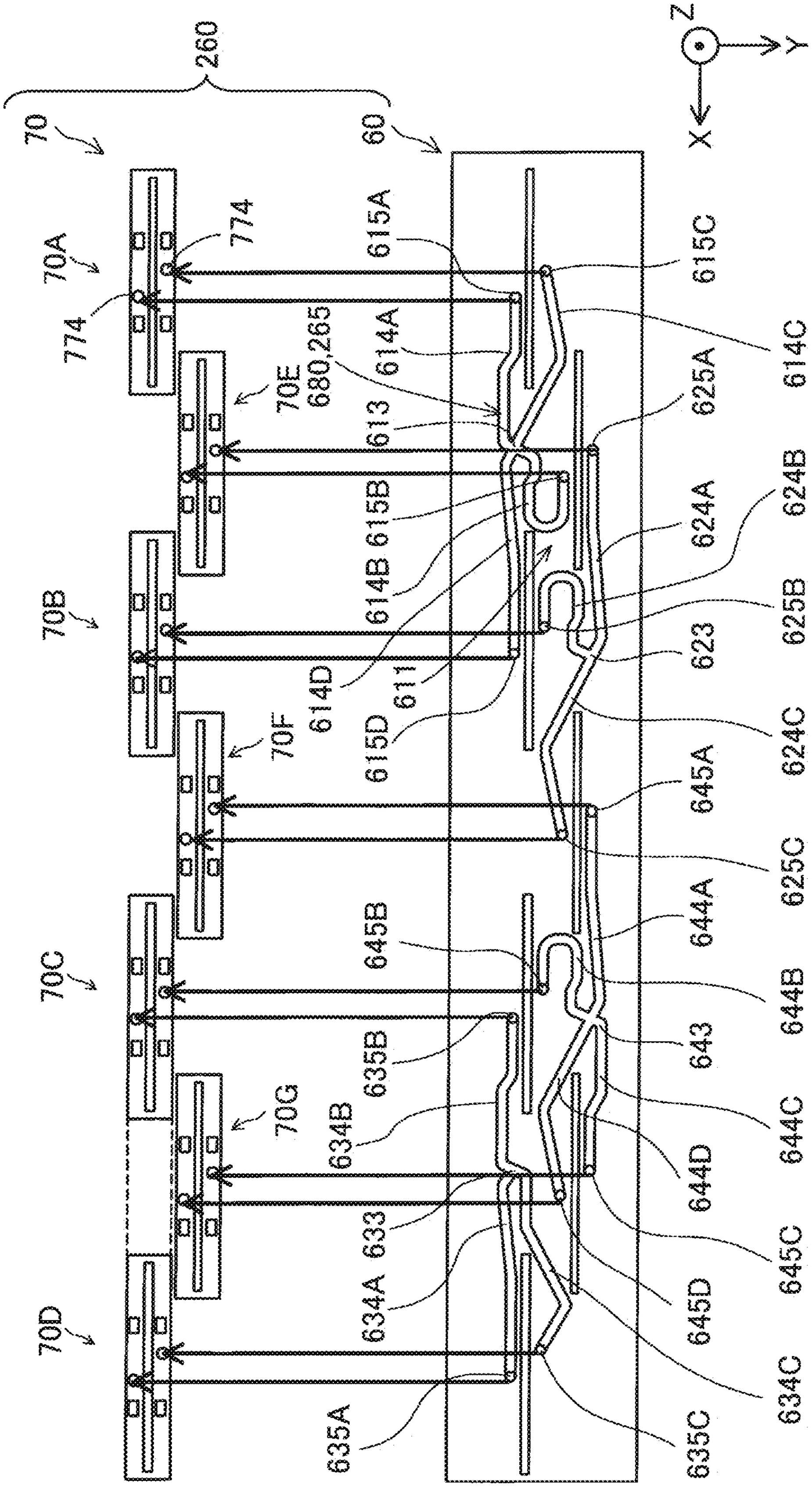
FIG. 6 is a second diagram for explaining the distribution flow channels.

FIG. 5 is a first diagram for explaining the distribution flow channels 265. FIG. 6 is a second diagram for explaining the distribution flow channels 265. Among the distribution flow channels 265, FIG. 5 illustrates the main branching flow channel 580 defined by the first flow channel substrate 40 and the second flow channel substrate 50, and a sub branching flow channel 680 defined by the second flow channel substrate 50 and the third flow channel substrate 60. Although the introduction port 41*h* is provided to the first flow channel substrate 40 as mentioned above, FIG. 5 also illustrates the introduction port 41*h* in order to explain a positional relation of the introduction port 41*h* with the main branching flow channel 580. Connection relations of the sub branching flow channel 680 with the head chips 70 are schematically indicated with arrows in FIG. 6. Meanwhile, codes “A” to “G” are suffixed to the head chips 70 in FIG. 6 in order to distinguish the head chips 70 from one another.

As illustrated in a drawing on a lower side in FIG. 5, the main branching flow channel 580 is constructed from grooves formed in at least one of a surface of the first flow channel substrate 40 opposed to the second flow channel substrate 50 and a surface of the second flow channel substrate 50 opposed to the first flow channel substrate 40, and through holes formed in the second flow channel substrate 50. FIG. 5 illustrates the main branching flow channel 580 formed from the grooves and the through holes which are formed in the second flow channel substrate 50. As illustrated in a drawing on an upper side in FIG. 5, the sub branching flow channel 680 is constructed from grooves formed in at least one of a surface of the second flow channel substrate 50 opposed to the third flow channel substrate 60 and a surface of the third flow channel substrate 60 opposed to the second flow channel substrate 50, and through holes formed in the third flow channel substrate 60. FIG. 5 illustrates the sub branching flow channel 680 formed from the grooves and the through holes which are formed in the third flow channel substrate 60.

The first flow channel substrate 40 includes through holes 48 illustrated in FIG. 2 into which the corresponding flexible boards 78 are inserted. More than one through hole 48 is provided, and seven through holes 48 are provided in the present embodiment. Each through hole 48 has a rectangular shape. As illustrated in FIG. 5, the second flow channel substrate 50 includes through holes 58 into which the corresponding flexible boards 78 are inserted. More than one through hole 58 is provided, and seven through holes 58 are provided in the present embodiment. Likewise, the third flow channel substrate 60 includes through holes 68 into which the corresponding flexible boards 78 are inserted. More than one through hole 68 is provided, and seven through hole 68 are provided in the present embodiment. When viewed in the direction of lamination, the corresponding through holes 48, 58, and 68 are disposed at positions overlapping the corresponding insertion holes 88 illustrated in FIG. 4.

The distribution flow channels 265 include the main branching flow channel 580 defined by the first flow channel substrate 40 and the second flow channel substrate 50, and the sub branching flow channel 680 defined by the second flow channel substrate 50 and the third flow channel substrate 60. The main branching flow channel 580 includes four main branching portions 51, 52, 53, and 54 that branch off at a main branching position Mp. The main branching position Mp is a position at a portion of the distribution flow channel 265 to which the introduction port 41*h* of the flow channel pipe 41 is connected. That is to say, the main branching position Mp overlaps the introduction port 41*h* when viewed in the direction of lamination.

The main branching position Mp overlaps the first gap Ga when viewed in the direction of lamination. Here, in a different embodiment, the main branching position Mp may overlap the second gap Gb when viewed in the direction of lamination. Since the main branching position Mp overlaps the first gap Ga or the second gap Gb when viewed in the direction of lamination, it is possible to reduce a variation in pressure loss among the respective flow channels that extend from the main branching position Mp to the respective head chips 70 through the distribution flow channels 265 as compared to a case where the main branching position Mp overlaps any of the head chips 70. In this way, the liquid is supplied more evenly to the respective head chips 70.

Moreover, the main branching position Mp overlaps, out of the first gaps Ga, a first gap Gac disposed at the center in terms of the direction along the x axis direction when viewed in the direction of lamination. Accordingly, it is possible to further reduce the variation in pressure loss among the respective flow channels that extend from the main branching position Mp to the respective head chips 70 through the distribution flow channels 265.

The main branching portion 51 is a flow channel that extends from the main branching position Mp in one direction out of directions along the x axis direction. The main branching portion 51 does not include a substantially U-shaped bent portion. In the present embodiment, the main branching portion 51 has a substantially straight shape. In a different embodiment, however, the main branching portion 51 is not limited to the straight shape as long as the main branching portion 51 is not provided with a substantially U-shaped bent portion that changes a direction of flow of the liquid by 110° or more.

The main branching portion 52 is a flow channel that extends from the main branching position Mp in a direction different from the directions along the x axis direction. The main branching portion 52 is a bent flow channel. The main branching portion 52 includes a substantially U-shaped bent portion 521 that changes the direction of flow of the liquid by 110° or more. In the present embodiment, the bent portion 521 changes the direction of flow of the liquid by 180°, thus changing the direction of flow into the reverse direction.

The main branching portion 53 is a flow channel that extends from the main branching position Mp in another direction out of the directions along the x axis direction, which is an opposite direction to the direction of extension of the main branching portion 51. The main branching portion 53 does not include a substantially U-shaped bent portion. In the present embodiment, the main branching portion 53 has a substantially straight shape. In a different embodiment, however, the main branching portion 53 is not limited to the straight shape as long as the main branching portion 53 is not provided with a substantially U-shaped bent portion that changes the direction of flow of the liquid by 110° or more.

The main branching portion 54 is a flow channel that extends from the main branching position Mp in a direction different from the directions along the x axis direction. The main branching portion 54 is a bent flow channel. The main branching portion 54 includes a substantially U-shaped bent portion 541 that changes the direction of flow of the liquid by 110° or more. In the present embodiment, the bent portion 541 changes the direction of flow of the liquid by 180°, thus changing the direction of flow into the reverse direction.

When a line that passes through the main branching position Mp and extends in parallel with the direction along the y axis direction is defined as a reference line Ls, the main branching portion 51 is line-symmetrical to the main branching portion 53 with respect to the reference line Ls. The main branching portion 52 is line-symmetrical to the main branching portion 54 with respect to the reference line Ls.

The distribution flow channels 265 further include connection flow channels 513, 523, 533, and 543 formed in the second flow channel substrate 50. The connection flow channels 513, 523, 533, and 543 are through holes that pass through the second flow channel substrate 50 in the direction of lamination. That is to say, the connection flow channels 513, 523, 533, and 543 are flow channels that extend in the direction of lamination. In terms of the flow direction being the direction of flow of the liquid from the flow channel pipe 41 to the head chips 70, the connection flow channel 513 is connected to a downstream end of the main branching portion 51. In terms of the flow direction, the connection flow channel 523 is connected to a downstream end of the main branching portion 52. In terms of the flow direction, the connection flow channel 533 is connected to a downstream end of the main branching portion 53. In terms of the flow direction, the connection flow channel 543 is connected to a downstream end of the main branching portion 54. Connection relations of the respective connection flow channels 513, 523, 533, and 543 will be described later.

As illustrated in the drawing on the upper side in FIG. 5, the distribution flow channels 265 further include sub branching flow channels 680A, 680B, 680C, and 680D defined by the second flow channel substrate 50 and the third flow channel substrate 60. The respective sub branching flow channels 680A, 680B, 680C, and 680D constituting the sub branching flow channel 680 are disposed between the main branching flow channel 580 and the head chips 70 in terms of the direction of lamination. To be more precise, the respective sub branching flow channels 680A, 680B, 680C, and 680D are disposed at the same position in terms of the direction of lamination.

The sub branching flow channel 680A is a flow channel that communicates with the main branching portion 51. To be more precise, the sub branching flow channel 680A communicates with the main branching portion 51 by the connection flow channel 513 connecting the main branching portion 51 to the sub branching flow channel 680A. The sub branching flow channel 680A includes sub branching portions 614A, 614B, 614C, and 614D that branch off at a sub branching position 613. The sub branching position 613 overlaps the first gap Ga when viewed in the direction of lamination. This makes it possible to reduce a variation in pressure loss among the respective flow channels that branch off from the sub branching position 613 and reach the respective head chips 70 through the sub branching portions 614A, 614B, 614C, and 614D as compared to a case where the sub branching position 613 overlaps a head chip 70 when viewed in the direction of lamination. Accordingly, the liquid is supplied more evenly to the respective head chips 70. The sub branching position 613 overlaps the connection flow channel 513 when viewed in the direction of lamination. That is to say, the sub branching position 613 is located immediately below the connection flow channel 513. This makes it possible to cause the liquid to branch off immediately after having passed through the connection flow channel 513, thereby reducing redundant flow passage portions. Thus, the variation in pressure loss among the respective flow channels can further be reduced.

The sub branching portions 614A, 614C, and 614D do not include substantially U-shaped portions. In the present embodiment, the sub branching portions 614A, 614C, and 614D each have a shape obtained by combining straight flow channels. In a different embodiment, however, the sub branching portions 614A, 614C, and 614D are not limited to the shapes illustrated in FIG. 5 as long as the sub branching portions 614A, 614C, and 614D are not provided with a substantially U-shaped bent portion that changes the direction of flow of the liquid by 110° or more. The sub branching portion 614B includes a substantially U-shaped bent portion 611 that changes the direction of flow of the liquid by 110° or more. In the present embodiment, the bent portion 611 changes the direction of flow of the liquid by 180°, thus changing the direction of flow into the reverse direction.

A connection flow channel 615A is connected to one end portion 613*e* of the sub branching portion 614A. The connection flow channel 615A is a through hole that passes through the third flow channel substrate 60 in the direction of lamination, which extends in the direction of lamination. As illustrated in FIG. 6, the connection flow channel 615A is connected to the supply port 774 that communicates with the nozzles Nz on one line out of the two nozzle lines 70L1 and 70L2 of the head chip 70A. The liquid having passed through the connection flow channel 615A is supplied to the head chip 70A.

As illustrated in FIG. 6, a connection flow channel 615B is connected to one end portion 614*e* of the sub branching portion 614B. The connection flow channel 615B is a through hole that passes through the third flow channel substrate 60 in the direction of lamination, which extends in the direction of lamination. The connection flow channel 615B is connected to the supply port 774 that communicates with the nozzles Nz on one line out of the two nozzle lines 70L1 and 70L2 of the head chip 70E. The liquid having passed through the connection flow channel 615B is supplied to the head chip 70E.

A connection flow channel 615C is connected to one end portion of the sub branching portion 614C. The connection flow channel 615C is a through hole that passes through the third flow channel substrate 60 in the direction of lamination, which extends in the direction of lamination. The connection flow channel 615C is connected to the supply port 774 that communicates with the nozzles Nz on the other line out of the two nozzle lines 70L1 and 70L2 of the head chip 70A. The liquid having passed through the connection flow channel 615C is supplied to the head chip 70A.

A connection flow channel 615D is connected to one end portion of the sub branching portion 614D. The connection flow channel 615D is a through hole that passes through the third flow channel substrate 60 in the direction of lamination, which extends in the direction of lamination. The connection flow channel 615D is connected to the supply port 774 that communicates with the nozzles Nz on one line out of the two nozzle lines 70L1 and 70L2 of the head chip 70B. The liquid having passed through the connection flow channel 615D is supplied to the head chip 70B.

As illustrated in FIG. 5, the sub branching flow channel 680B is a flow channel that communicates with the main branching portion 52. To be more precise, the sub branching flow channel 680B communicates with the main branching portion 52 by the connection flow channel 523 connecting the main branching portion 52 to the sub branching flow channel 680B. The sub branching flow channel 680B includes sub branching portions 624A, 624B, and 624C that branch off at a sub branching position 623. The number N1 of the sub branching portions 614A, 614B, 614C, and 614D that branch off at the sub branching position 613 of the sub branching flow channel 680A is different from the number N2 of the sub branching portions 624A, 624B, and 624C that branch off at the sub branching position 623 of the sub branching flow channel 680B. Accordingly, it is possible to flexibly determine the numbers of the branching flow channels in the case where the number N1 and the number N2 cannot be set to the same number. Here, in order to reduce a variation in length among the respective flow channels extending from the introduction port 41*h* to the respective head chips 70, a difference between the number N1 and the number N2 is preferably set to 1 in the case where the number N1 and the number N2 cannot be set to the same number.

The sub branching position 623 overlaps the second gap Gb when viewed in the direction of lamination. This makes it possible to reduce a variation in pressure loss among the respective flow channels that branch off from the sub branching position 623 and reach the respective head chips 70 through the sub branching portions 624A, 624B, and 624C as compared to a case where the sub branching position 623 overlaps a head chip 70 when viewed in the direction of lamination. The sub branching position 623 overlaps the connection flow channel 523 when viewed in the direction of lamination. That is to say, the sub branching position 623 is located immediately below the connection flow channel 523. This makes it possible to cause the liquid to branch off immediately after having passed through the connection flow channel 523, thereby reducing redundant flow passage portions. Thus, the variation in pressure loss among the respective flow channels can further be reduced.

The sub branching portions 624A and 624C do not include substantially U-shaped portions. In the present embodiment, the sub branching portions 624A and 624C each have a shape obtained by combining straight flow channels. In a different embodiment, however, the sub branching portions 624A and 624C are not limited to the shapes illustrated in FIG. 5 as long as the sub branching portions 624A and 624C are not provided with a substantially U-shaped bent portion that changes the direction of flow of the liquid by 110° or more. The sub branching portion 624B includes a substantially U-shaped bent portion 621 that changes the direction of flow of the liquid by 110° or more. In the present embodiment, the bent portion 621 changes the direction of flow of the liquid by 180°, thus changing the direction of flow into the reverse direction.

As illustrated in FIG. 6, a connection flow channel 625A is connected to one end portion of the sub branching portion 624A. The connection flow channel 625A is a through hole that passes through the third flow channel substrate 60 in the direction of lamination, which extends in the direction of lamination. The connection flow channel 625A is connected to the supply port 774 that communicates with the nozzles Nz on the other line out of the two nozzle lines 70L1 and 70L2 of the head chip 70E. The liquid having passed through the connection flow channel 625A is supplied to the head chip 70E.

A connection flow channel 625B is connected to one end portion of the sub branching portion 624B. The connection flow channel 625B is a through hole that passes through the third flow channel substrate 60 in the direction of lamination, which extends in the direction of lamination. The connection flow channel 625B is connected to the supply port 774 that communicates with the nozzles Nz on the other line out of the two nozzle lines 70L1 and 70L2 of the head chip 70B. The liquid having passed through the connection flow channel 625B is supplied to the head chip 70B.

A connection flow channel 625C is connected to one end portion of the sub branching portion 624C. The connection flow channel 625C is a through hole that passes through the third flow channel substrate 60 in the direction of lamination, which extends in the direction of lamination. The connection flow channel 625C is connected to the supply port 774 that communicates with the nozzles Nz on one line out of the two nozzle lines 70L1 and 70L2 of the head chip 70F. The liquid having passed through the connection flow channel 625C is supplied to the head chip 70F.

As illustrated in FIG. 5, the sub branching flow channel 680C is a flow channel that communicates with the main branching portion 53. To be more precise, the sub branching flow channel 680C communicates with the main branching portion 53 by the connection flow channel 533 connecting the main branching portion 53 to the sub branching flow channel 680C. The sub branching flow channel 680C includes sub branching portions 634A, 634B, and 634C that branch off at a sub branching position 633. The sub branching position 633 overlaps the first gap Ga when viewed in the direction of lamination. This makes it possible to reduce a variation in pressure loss among the respective flow channels that branch off from the sub branching position 633 and reach the respective head chips 70 through the sub branching portions 634A, 634B, and 634C as compared to a case where the sub branching position 633 overlaps a head chip 70 when viewed in the direction of lamination. Accordingly, the liquid is supplied more evenly to the respective head chips 70. The sub branching position 633 overlaps the connection flow channel 533 when viewed in the direction of lamination. That is to say, the sub branching position 633 is located immediately below the connection flow channel 533. This makes it possible to cause the liquid to branch off immediately after having passed through the connection flow channel 533, thereby reducing redundant flow passage portions. Thus, the variation in pressure loss among the respective flow channels can further be reduced.

The sub branching portions 634A, 634B, and 634C do not include substantially U-shaped portions. In the present embodiment, the sub branching portions 634A, 634B, and 634C each have a shape obtained by combining straight flow channels. In a different embodiment, however, the sub branching portions 634A, 634B, and 634C are not limited to the shapes illustrated in FIG. 5 as long as the sub branching portions 634A, 634B, and 634C are not provided with a substantially U-shaped bent portion that changes the direction of flow of the liquid by 110° or more.

A connection flow channel 635A is connected to one end portion of the sub branching portion 634A. The connection flow channel 635A is a through hole that passes through the third flow channel substrate 60 in the direction of lamination, which extends in the direction of lamination. As illustrated in FIG. 6, the connection flow channel 635A is connected to the supply port 774 that communicates with the nozzles Nz on one line out of the two nozzle lines 70L1 and 70L2 of the head chip 70D. The liquid having passed through the connection flow channel 635A is supplied to the head chip 70D.

A connection flow channel 635B is connected to one end portion of the sub branching portion 634B. The connection flow channel 635B is a through hole that passes through the third flow channel substrate 60 in the direction of lamination, which extends in the direction of lamination. The connection flow channel 635B is connected to the supply port 774 that communicates with the nozzles Nz on one line out of the two nozzle lines 70L1 and 70L2 of the head chip 70C. The liquid having passed through the connection flow channel 635B is supplied to the head chip 70C.

A connection flow channel 635C is connected to one end portion of the sub branching portion 634C. The connection flow channel 635C is a through hole that passes through the third flow channel substrate 60 in the direction of lamination, which extends in the direction of lamination. The connection flow channel 635C is connected to the supply port 774 that communicates with the nozzles Nz on the other line out of the two nozzle lines 70L1 and 70L2 of the head chip 70D. The liquid having passed through the connection flow channel 635C is supplied to the head chip 70D.

As illustrated in FIG. 5, the sub branching flow channel 680D is a flow channel that communicates with the main branching portion 54. To be more precise, the sub branching flow channel 680D communicates with the main branching portion 54 by the connection flow channel 543 connecting the main branching portion 54 to the sub branching flow channel 680D. The sub branching flow channel 680D includes sub branching portions 644A, 644B, 644C, and 644D that branch off at a sub branching position 643. The sub branching position 643 overlaps the second gap Gb when viewed in the direction of lamination. This makes it possible to reduce a variation in pressure loss among the respective flow channels that branch off from the sub branching position 643 and reach the respective head chips 70 through the sub branching portions 644A, 644B, 644C, and 644D as compared to a case where the sub branching position 643 overlaps a head chip 70 when viewed in the direction of lamination. The sub branching position 643 overlaps the connection flow channel 543 when viewed in the direction of lamination. That is to say, the sub branching position 643 is located immediately below the connection flow channel 543. This makes it possible to cause the liquid to branch off immediately after having passed through the connection flow channel 543, thereby reducing redundant flow passage portions. Thus, the variation in pressure loss among the respective flow channels can further be reduced.

The sub branching portions 644A, 644C, and 644D do not include substantially U-shaped portions. In the present embodiment, the sub branching portions 644A, 644C, and 644D each have a shape obtained by combining straight flow channels. In a different embodiment, however, the sub branching portions 644A, 644C, and 644D are not limited to the shapes illustrated in FIG. 5 as long as the sub branching portions 644A, 644C, and 644D are not provided with a substantially U-shaped bent portion that changes the direction of flow of the liquid by 110° or more. The sub branching portion 644B includes a substantially U-shaped bent portion 641 that changes the direction of flow of the liquid by 110° or more. In the present embodiment, the bent portion 641 changes the direction of flow of the liquid by 180°, thus changing the direction of flow into the reverse direction.

As illustrated in FIG. 6, a connection flow channel 645A is connected to one end portion of the sub branching portion 644A. The connection flow channel 645A is a through hole that passes through the third flow channel substrate 60 in the direction of lamination, which extends in the direction of lamination. The connection flow channel 645A is connected to the supply port 774 that communicates with the nozzles Nz on the other line out of the two nozzle lines 70L1 and 70L2 of the head chip 70F. The liquid having passed through the connection flow channel 645A is supplied to the head chip 70F.

A connection flow channel 645B is connected to one end portion of the sub branching portion 644B. The connection flow channel 645B is a through hole that passes through the third flow channel substrate 60 in the direction of lamination, which extends in the direction of lamination. The connection flow channel 645B is connected to the supply port 774 that communicates with the nozzles Nz on the other line out of the two nozzle lines 70L1 and 70L2 of the head chip 70C. The liquid having passed through the connection flow channel 645B is supplied to the head chip 70C.

A connection flow channel 645C is connected to one end portion of the sub branching portion 644C. The connection flow channel 645C is a through hole that passes through the third flow channel substrate 60 in the direction of lamination, which extends in the direction of lamination. The connection flow channel 645C is connected to the supply port 774 that communicates with the nozzles Nz on one line out of the two nozzle lines 70L1 and 70L2 of the head chip 70G. The liquid having passed through the connection flow channel 645C is supplied to the head chip 70G.

A connection flow channel 645D is connected to one end portion of the sub branching portion 644D. The connection flow channel 645D is a through hole that passes through the third flow channel substrate 60 in the direction of lamination, which extends in the direction of lamination. The connection flow channel 645D is connected to the supply port 774 that communicates with the nozzles Nz on the other line out of the two nozzle lines 70L1 and 70L2 of the head chip 70G. The liquid having passed through the connection flow channel 645D is supplied to the head chip 70G.

As illustrated in FIG. 5, a distance L2 from the main branching position Mp to an end portion 52*e* of the main branching portion 52 on the opposite side from the main branching position Mp is shorter than a distance L1 from the main branching position Mp to an end portion 51*e* of the main branching portion 51 on the opposite side from the main branching position Mp when viewed in the direction of lamination. A distance L4 from the sub branching position 613 to an end portion 614*e* of the sub branching portion 614B on the opposite side from the sub branching position 613 is shorter than a distance L3 from the sub branching position 613 to an end portion 613*e* of the sub branching portion 614A on the opposite side from the sub branching position 613 when viewed in the direction of lamination. Each of the distances L1 to L4 is the shortest distance that connects between relevant two points.

According to the above-described embodiment, the main branching flow channel 580 and the sub branching flow channel 680 are provided at different positions in terms of the direction of lamination as illustrated in FIG. 5. That is to say, the main branching flow channel 580 is formed at the position between the first flow channel substrate 40 and the second flow channel substrate 50, and the sub branching flow channel 680 is formed at the position between the second flow channel substrate 50 and the third flow channel substrate 60. The respective flow channels branch off in the main branching flow channel 580 and the sub branching flow channel 680, which are formed at the different positions in terms of the direction of lamination. Accordingly, an increase in size of the distribution flow channel member can be suppressed in a direction orthogonal to the direction of lamination as compared to a case of forming the branching flow channels only at the same position in terms of the direction of lamination. Since the respective flow channels branch off in the main branching flow channel 580 and the sub branching flow channel 680, which are formed at the different positions in terms of the direction of lamination, it is possible to suppress complication in routing the flow channels at the same position in terms of the direction of lamination. Even in the case where a large number of branches are required, it is possible to reduce the number of the distribution flow channels 265 by carrying out branching in two stages by causing the flow channels to branch off in the main branching flow channel 580 and then causing the flow channels to branch off in the sub branching flow channel 680. In this way, when the flow channels such as tubes are directly connected to the flow channel pipe 41 of the distribution flow channel member 260, it is possible to reduce procedures to establish connection between the channels.

According to the above-described embodiment, the main branching flow channel 580 and the sub branching flow channel 680 are provided at the different positions in terms of the direction of lamination as illustrated in FIG. 5, and the respective flow channels branch off in the main branching flow channel 580 and the sub branching flow channel 680. Accordingly, it is possible to disperse the branching positions Mp, 613, 623, 633, and 643 of the flow channels. This makes it possible to reduce a variation in length among the respective flow channels that reach the respective head chips 70 in the distribution flow channels 265, so that the variation in pressure loss among the respective flow channels can further be reduced. As a consequence, it is possible to reduce a possibility of causing a variation in amount of the liquid to be supplied to the respective head chips 70.

As illustrated in FIG. 5, according to the present embodiment, the number of the distribution flow channels 265 can be reduced by causing the flow channels to branch off in two stages in the main branching flow channel 580 and the sub branching flow channel 680. To be more precise, regarding seven head chips 70, one distribution flow channel 265 can supply the liquid to the respective head chips 70 in the present embodiment. This makes it possible to reduce the number of the main branching flow channels 580 and to reduce the number of the filter units 25. As a consequence, manufacturing costs of the liquid ejecting head 3 can be reduced.

In the present embodiment, the number of the distribution flow channels 265 can be reduced by causing the flow channels to branch off in two stages in the main branching flow channel 580 and the sub branching flow channel 680. In this way, the number of the flow channel pipes 41 can also be reduced in accordance with the number of the distribution flow channels 265, so that the number of the through holes 85 or the cutouts to be provided to the relay boards 80 can also be reduced. Thus, it is possible to ensure a space for forming the wiring in each relay board 80. In this way, the relay board 80 can be reduced in size.

According to the present embodiment, the main branching flow channel 580 includes the four main branching portions 51, 52, 53, and 54, and the sub branching flow channels 680A, 680B, 680C, and 680D that communicate with the respective main branching portions 51, 52, 53, and 54 are also provided as illustrated in FIG. 5. This makes it possible to form more branching flow channels by using the main branching flow channel 580 and the sub branching flow channel 680 formed at the different positions in terms of the direction of lamination. Moreover, according to the present embodiment, the sub branching flow channels 680A, 680B, 680C, and 680D include the sub branching portions 614A to 614D, 624A to 624C, 634A to 634C, and 644A to 644D, each set being provided with three or more branching portions as illustrated in FIG. 5. This makes it possible to form even more branching flow channels.

According to the above-described embodiment, the main branching portion 52 includes the bent portion 521 while satisfying the relation that the distance L2 is shorter than the distance L1. This makes it possible to suppress an increase in difference between a flow channel length of the main branching portion 52 and a flow channel length of the main branching portion 51 and thus to suppress an increase in difference between the pressure loss of the main branching portion 51 and the pressure loss of the main branching portion 52. In particular, the increase in difference between the flow channel length of the main branching portion 52 and the flow channel length of the main branching portion 51 can be suppressed more appropriately since the main branching portion 51 does not include a substantially U-shaped bent portion. Thus, it is possible to suppress the increase in difference between the pressure loss of the main branching portion 51 and the pressure loss of the main branching portion 52 more appropriately. Here, the positional relation between the main branching portion 53 and the main branching portion 54 and the shapes of the flow channels of the main branching portion 53 and the main branching portion 54 are the same as those of the main branching portion 51 and the main branching portion 52. Accordingly, the main branching portion 53 and the main branching portion 54 also have the same effects regarding the pressure loss.

Regarding the sub branching flow channel 680A according to the present embodiment, the sub branching portion 614B includes the substantially U-shaped bent portion 611 while satisfying the relation that the distance L4 is shorter than the distance L3. This makes it possible to suppress an increase in difference between a flow channel length of the sub branching portion 614A and a flow channel length of the sub branching portion 614B and thus to suppress an increase in difference between the pressure loss of the sub branching portion 614A and the pressure loss of the sub branching portion 614B. In particular, the increase in difference between the flow channel length of the sub branching portion 614A and the flow channel length of the sub branching portion 614B can be suppressed more appropriately since the sub branching portion 614A does not include a substantially U-shaped bent portion. Thus, it is possible to suppress the increase in difference between the pressure loss of the sub branching portion 614A and the pressure loss of the sub branching portion 614B more appropriately. Here, regarding the sub branching flow channel 680A, the relations of the flow channel length of the sub branching portion 614B with flow channel lengths of other sub branching portions 614C and 614D not provided with a bent portion are also the same as the relation between the flow channel length of the sub branching portion 614B and the flow channel length of the sub branching portion 614A. Further, regarding the sub branching flow channels 680B and 680D, relations of flow channel lengths of the sub branching portions 624B and 644B including the bent portions 621 and 641 with flow channel lengths of the sub branching portions 624A, 624C, 644A, 644C, and 644D not provided with a bent portion are also the same as the relation between the flow channel length of the sub branching portion 614B and the flow channel length of the sub branching portion 614A.

According to the present embodiment, the sub branching positions 613 and 633 overlap the first gap Ga while the sub branching positions 623 and 643 overlap the second gap Gb when viewed in the direction of lamination as illustrated in FIG. 5. This makes it possible to suppress interferences of the sub branching positions 613, 623, 633, and 643 with the flexible board 78 that extends inside the distribution flow channel member 260 along the direction of lamination. Moreover, this makes it possible to form the branching flow channels in the sub branching flow channels 680A to 680D by effectively using the gaps Ga and Gb between the head chips 70, thereby suppressing an increase in size of the distribution flow channel member 260 in a horizontal direction being orthogonal to the direction of lamination.

According to the above-described embodiment, the main branching position Mp overlaps the first gap Ga when viewed in the direction of lamination. Thus, it is possible to suppress an interference of the main branching position Mp with the flexible board 78 that extends inside the distribution flow channel member 260 along the direction of lamination. Moreover, this aspect makes it possible to form the branching flow channels in the main branching flow channel 580 by effectively using the gap Ga between the head chips 70, thereby suppressing the increase in size of the distribution flow channel member 260 in the horizontal direction being orthogonal to the direction of lamination.

According to the above-described embodiment, the main branching position Mp overlaps the introduction port 41*h* when viewed in the direction of lamination, and the sub branching positions 613, 623, 633, and 643 overlap the corresponding connection flow channels 513, 523, 533, and 543. Thus, redundant flow channel portions can be reduced. As a consequence, it is possible to reduce the pressure losses of the respective flow channels that reach the head chips 70.

The main branching portion 51 is an example of a "first main branching portion". The main branching portion 52 is an example of a "second main branching portion". The main branching portion 53 is an example of a "third main branching portion". The main branching portion 54 is an example of a "fourth main branching portion". The connection flow channel 513 is an example of a "first connection flow channel". The connection flow channel 523 is an example of a "second connection flow channel". The connection flow channel 533 is an example of a "third connection flow channel". The connection flow channel 543 is an example of a "fourth connection flow channel". The sub branching flow channel 680A is an example of a "first sub branching flow channel". The sub branching flow channel 680B is an example of a "second sub branching flow channel". The sub branching flow channel 680C is an example of a "third sub branching flow channel". The sub branching flow channel 680D is an example of a "fourth sub branching flow channel". The sub branching position 613 is an example of a "first sub branching position". The sub branching position 623 is an example of a "second sub branching position". The sub branching position 633 is an example of a "third sub branching position". The sub branching position 643 is another example of the "third sub branching position". The sub branching portion 614A is an example of a "first sub branching position A". The sub branching portion 614B is an example of a "first sub branching position B". The sub branching portion 614C is an example of a "first sub branching position C". The sub branching portion 614D is an example of a "first sub branching position D". The sub branching portion 624A is an example of a "second sub branching position A". The sub branching portion 624B is an example of a "second sub branching position B". The sub branching portion 624C is an example of a "second sub branching position C". The sub branching portion 634A is an example of a "third sub branching position A". The sub branching portion 634B is an example of a "third sub branching position B".

B. Other Embodiments

In the above-described embodiment, the flow channel pipe 41 is provided to the first flow channel substrate 40 of the distribution flow channel member 260 as illustrated in FIG. 2. However, the present disclosure is not limited to this configuration. The flow channel pipe 41 may be provided by causing the supply pipe 36 in the filter unit 25 to further extend toward the distribution flow channel member 260.

C. Other Aspects

The present disclosure is not limited to the above-described embodiments and can be realized in various other aspects within the range not departing from the gist thereof. For example, the present disclosure can also be realized in accordance with the following aspects. The technical features in the above-described embodiments corresponding to technical features of the respective aspects to be described below can be replaced or combined as appropriate in order to solve all or part of the issues of the present disclosure or to achieve all or part of the effects of the present disclosure. Any of the technical features may be deleted as appropriate unless such a technical feature is described in the present disclosure as being an indispensable feature.

(1) According to a first aspect of the present disclosure, a liquid ejecting head is provided. The liquid ejecting head includes: a plurality of head chips including a plurality of first head chips being arranged in a first direction and constituting a first chip line, and a plurality of second head chips being arranged in the first direction and constituting a second chip line; and a distribution flow channel member including a distribution flow channel formed by laminating a plurality of flow channel substrates in a direction of lamination and configured to distribute and supply the liquid to the plurality of head chips. The second chip line is displaced from the first chip line in a second direction being orthogonal to both the first direction and the direction of lamination, a first gap is defined between the first head chips located adjacent to each other out of the plurality of first head chips, a second gap is defined between the second head chips located adjacent to each other out of the plurality of second head chips, at least one or more of the second head chips out of the plurality of second head chips are disposed at positions filling one or more of the first gaps when viewed in the second direction, the distribution flow channel includes a main branching flow channel having a first main branching portion and a second main branching portion which branch off at a main branching position, a first sub branching flow channel being a flow channel disposed between the main branching flow channel and the plurality of head chips in terms of the direction of lamination and configured to communicate with the first main branching portion, the first sub branching flow channel including a first sub branching portion A and a first sub branching portion B which branch off at a first sub branching position, and the first sub branching position overlaps the first gap when viewed in the direction of lamination.

(2) In the aspect described above, the distribution flow channel may include a second sub branching flow channel being a flow channel disposed at a position equivalent to a position of the first sub branching flow channel in terms of the direction of lamination and configured to communicate with the second main branching portion, the second sub branching flow channel including a second sub branching portion A and a second sub branching portion B which branch off at a second sub branching position, and the second sub branching position may overlap the second gap when viewed in the direction of lamination. According to this aspect, it is possible to further suppress the variation in pressure loss among the respective flow channels of the distribution flow channel which reach the respective head chips.

(3) In the aspect described above, the liquid ejecting head may further include: a relay board electrically coupled to the plurality of head chips, the distribution flow channel member may be disposed between the relay board and the plurality of head chips in terms of the direction of lamination, and each of the plurality of head chips may include a flexible board passing through the distribution flow channel member and electrically coupled to the relay board. According to this aspect, the first sub branching position overlaps the first gap when viewed in the direction of lamination. Thus, it is possible to suppress an interference of the first sub branching position with the flexible board.

(4) In the aspect described above, the first sub branching flow channel may further include a first sub branching portion C which branches off at the first sub branching position. According to this aspect, it is possible to increase the number of the flow channels that branch off in the first sub branching flow channel. Moreover, according to this aspect, the flow channels that branch off in the first sub branching flow channel can be formed by effectively using the gap between the head chips since the first sub branching position overlaps the first gap when viewed in the direction of lamination. Thus, it is possible to suppress an increase in size of the distribution flow channel member in a horizontal direction being orthogonal to the direction of lamination.

(5) In the aspect described above, the main branching position may overlap the first gap or the second gap when viewed in the direction of lamination. According to this aspect, it is possible to further suppress the variation in pressure loss among the respective flow channels which reach the respective head chips as compared to the case where the main branching position is located at a position overlapping a head chip when viewed in the direction of lamination.

(6) In the aspect described above, number of the first head chips may be larger than number of the second head chips and is an even number, and the main branching position may overlap the first gap disposed at a center in terms of the first direction out of the plurality of the first gaps when viewed in the direction of lamination. According to this aspect, it is possible to further suppress the variation in pressure loss among the respective flow channels of the distribution flow channel which reach the respective head chips.

(7) In the aspect described above, the liquid ejecting head may further include: a relay board electrically coupled to the plurality of head chips, the distribution flow channel member may be disposed between the relay board and the plurality of head chips in terms of the direction of lamination, and each of the plurality of head chips may include a flexible board passing through the distribution flow channel member and electrically coupled to the relay board. According to this aspect, the main branching position overlaps the first gap or the second gap when viewed in the direction of lamination. Thus, it is possible to suppress an interference of the main branching position with the flexible board.

(8) In the aspect described above, the main branching flow channel may further include a third main branching portion which branches off at the main branching position. According to this aspect, it is possible to increase the number of the flow channels branching off in the main branching flow channel. Moreover, according to this aspect, the flow channels that branch off in the main branching flow channel can be formed by effectively using the gap between the head chips since the main branching position overlaps the first gap or the second gap when viewed in the direction of lamination. Thus, it is possible to suppress an increase in size of the distribution flow channel member in the horizontal direction being orthogonal to the direction of lamination.

(9) In the aspect described above, the distribution flow channel may include an introduction port configured to introduce the liquid to the main branching flow channel, and a first connection flow channel connecting the first main branching portion to the first sub branching flow channel and extending in the direction of lamination, the main branching position may overlap the introduction port when viewed in the direction of lamination, and the first sub branching position may overlap the first connection flow channel when viewed in the direction of lamination. According to this aspect, the main branching position overlaps the introduction port when viewed in the direction of lamination, and the first sub branching position overlaps the first connection flow channel when viewed in the direction of lamination. Thus, redundant flow channel portions can be reduced. As a consequence, it is possible to reduce the pressure losses of the respective flow channels that reach the head chips.

(10) According to a second aspect of the present disclosure, a liquid ejecting apparatus is provided. The liquid ejecting apparatus includes: the liquid ejecting head according to the aspect described above; and a liquid reservoir configured to reserve the liquid to be supplied to the liquid ejecting head. According to this aspect, the main branching flow channel and the sub branching flow channel are provided at different positions in terms of the direction of lamination, and the respective flow channels branch off in the main branching flow channel and the sub branching flow channel. Thus, it is possible to disperse the branching positions of the flow channels. This makes it possible to further reduce the variation in pressure loss among the respective flow channels in the distribution flow channel which reach the respective head chips. In addition, according to this aspect, it is possible to reduce the variation in pressure loss among the respective flow channels as compared to the case where the sub branching position is located at the position overlapping a head chip when viewed in the direction of lamination.

The present disclosure can also be realized in various aspects other than the above-described aspects. For example, the present disclosure can be realized as an aspect of a method of manufacturing a liquid ejecting head or a liquid ejecting apparatus.

What is claimed is:

1. A liquid ejecting head comprising:

head chips including first head chips being arranged in a first direction and constituting a first chip line, and second head chips being arranged in the first direction and constituting a second chip line; and a distribution flow channel member including a distribution flow channel formed by laminating flow channel substrates in a direction of lamination and configured to distribute and supply the liquid to the head chips, wherein the second chip line is displaced from the first chip line in a second direction being orthogonal to both the first direction and the direction of lamination, a first gap is defined between the first head chips located adjacent to each other among the first head chips, a second gap is defined between the second head chips located adjacent to each other among the second head chips, at least one or more of the second head chips among the second head chips are disposed at positions filling one or more of the first gaps when viewed in the second direction, the distribution flow channel includes a main branching flow channel having a first main branching portion and a second main branching portion which branch off at a main branching position, a first sub branching flow channel being a flow channel disposed between the main branching flow channel and the head chips with respect to the direction of lamination and configured to communicate with the first main branching portion, the first sub branching flow channel including a first sub branching portion A and a first sub branching portion B which branch off at a first sub branching position, and the first sub branching position overlaps the first gap when viewed in the direction of lamination.

2. The liquid ejecting head according to claim 1, wherein the distribution flow channel includes a second sub branching flow channel being a flow channel disposed at a position equivalent to a position of the first sub branching flow channel with respect to the direction of lamination and configured to communicate with the second main branching portion, the second sub branching flow channel including a second sub branching portion A and a second sub branching portion B which branch off at a second sub branching position, and the second sub branching position overlaps the second gap when viewed in the direction of lamination.

3. The liquid ejecting head according to claim 1, further comprising:

a relay board electrically coupled to the head chips, wherein the distribution flow channel member is disposed between the relay board and the head chips with respect to the direction of lamination, and each of the head chips includes a flexible board passing through the distribution flow channel member and electrically coupled to the relay board.

4. The liquid ejecting head according to claim 1, wherein the first sub branching flow channel further includes a first sub branching portion C which branches off at the first sub branching position.

5. The liquid ejecting head according to claim 1, wherein the main branching position overlaps the first gap or the second gap when viewed in the direction of lamination.

6. The liquid ejecting head according to claim 5, wherein number of the first head chips is larger than number of the second head chips and is an even number, and the main branching position overlaps the first gap disposed at a center with respect to the first direction among the first gaps when viewed in the direction of lamination.

7. The liquid ejecting head according to claim 5, further comprising:

a relay board electrically coupled to the head chips, wherein the distribution flow channel member is disposed between the relay board and the head chips with respect to the direction of lamination, and each of the head chips includes a flexible board passing through the distribution flow channel member and electrically coupled to the relay board.

8. The liquid ejecting head according to claim 5, wherein the main branching flow channel further includes a third main branching portion which branches off at the main branching position.

9. The liquid ejecting head according to claim 1, wherein the distribution flow channel includes an introduction port configured to introduce the liquid to the main branching flow channel, and a first connection flow channel connecting the first main branching portion to the first sub branching flow channel and extending in the direction of lamination, the main branching position overlaps the introduction port when viewed in the direction of lamination, and the first sub branching position overlaps the first connection flow channel when viewed in the direction of lamination.

10. A liquid ejecting apparatus comprising:

the liquid ejecting head according to claim 1; and a liquid reservoir configured to reserve the liquid to be supplied to the liquid ejecting head.

* * * * *